UNITED STATES PATENT OFFICE.

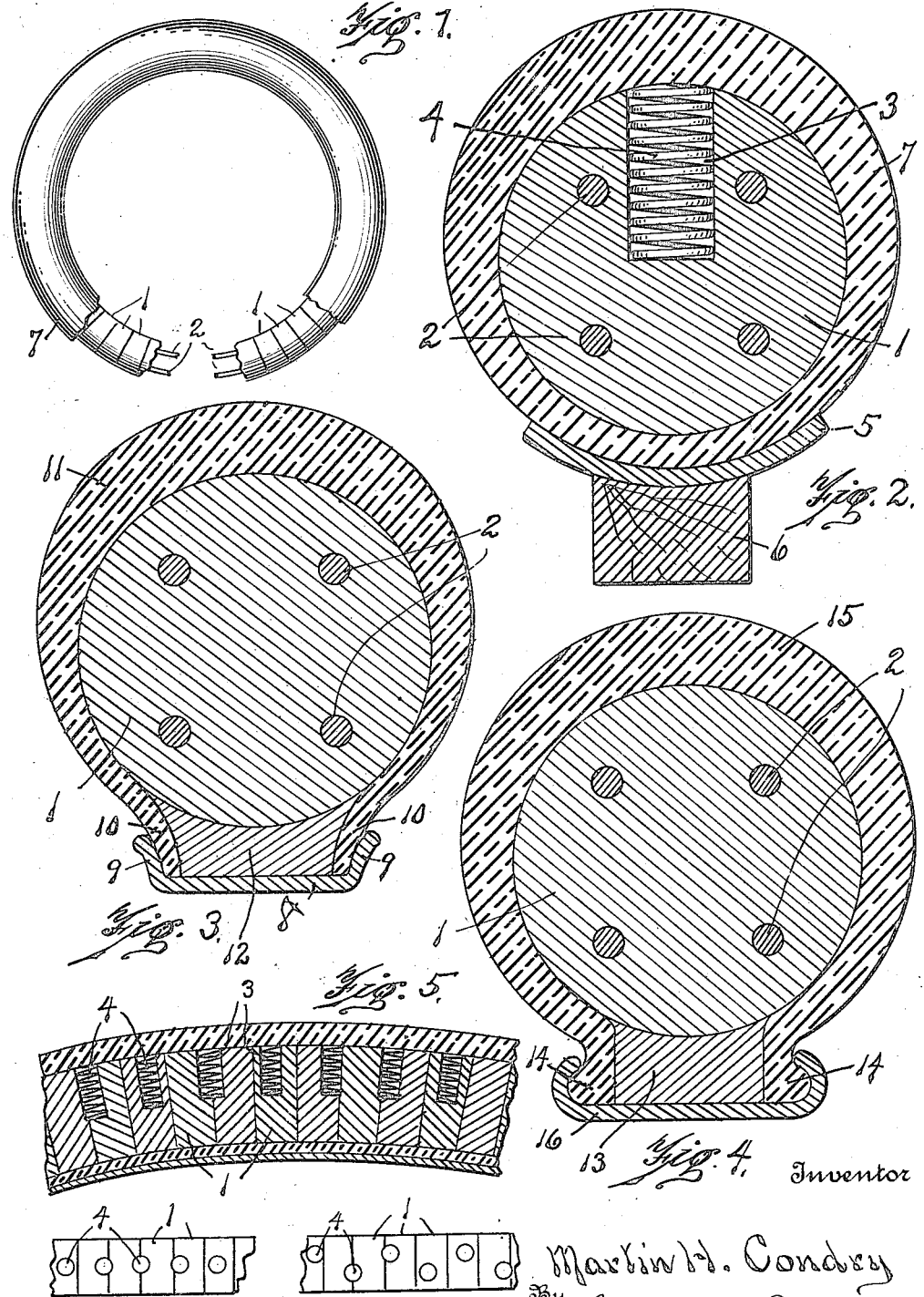

MARTIN H. CONDRY, OF DETROIT, MICHIGAN.

CUSHION-TIRE.

1,372,669.   Specification of Letters Patent.   Patented Mar. 29, 1921.

Application filed February 13, 1920. Serial No. 358,419.

*To all whom it may concern:*

Be it known that I, MARTIN H. CONDRY, a citizen of the United States, and residing at Detroit, in the county of Wayne and State of Michigan, have invented a new and Improved Cushion-Tire, of which the following is a specification.

This invention relates to tires of the cushion type as distinguished from pneumatic tires, and its object is to produce a tire which shall have long life, which will be very resilient and which can be produced at moderate cost.

This invention consists of a ring built up of solid sectors of cork, the ring being substantially circular in cross-section and the sectors of cork being held together by means of a plurality of endless rings of resilient metal, preferably steel.

It further consists in inclosing this ring of cork in a casing of flexible resilient material, such as rubber, which may constitute the wearing portion of the tire.

It also consists in the details of construction illustrated in the accompanying drawing and particularly pointed out in the claims.

In the drawing, Figure 1 is an elevation of a tire embodying my invention, the structure being broken away progressively to show the manner of building it. Fig. 2 is a cross section of the tire shown in Fig. 1 mounted on a rim. Figs. 3 and 4 are similar sections of modified forms of tires. Fig. 5 is a central longitudinal section of a portion of tire parallel to the plane of Fig. 1 on a smaller scale. Figs. 6 and 7 are diagrams on a small scale illustrating the methods of inserting springs.

Similar reference characters refer to like parts throughout the several views.

The several tires shown in the drawings are built up of disks 1 of cork, preferably circular, with their sides tapering toward a common center. These sectors are perforated to receive the rods 2, preferably of spring steel, on which they are strung and very firmly compressed so as to leave short ends of the rods projecting from the ends of the stack of segments. The ends of the rods are then welded together after which the segments are released to thereupon return to their original thickness and in doing so slip together over the welded portions of the rods and complete the ring.

At regular intervals along the outer portion of the tire the radial holes 3 are formed in the outer face of the cork to receive the springs 4 which snugly fit these holes when inserted and bind therein when compressed. This series of holes may be in a straight line as shown in Fig. 6 or staggered as shown in Fig. 7 and their depth is preferably one half the thickness of the ring.

The wear of the roadway is taken by a casing whose shape depends upon the character of the rim on which the tire is mounted. In Fig. 2 a split metal rim 5 is mounted on the felly 6 and this rim is a segment of a circle in cross section. The casing 7 is shown thinner between the cork center and the rim than at the tread. The springs 4 exert an outward pressure on the casing.

In Fig. 3, the "straight side" rim 8 has flanges 9 which brace the edges 10 of the casing 11. A band 12 of filling material, which may be a low grade rubber or rubber substitute, is placed between the edges 10 of the casing. Similarly, the band 13 holds out the ribs 14 of the casing 15 into the grooves of the clencher rim 16, as shown in Fig. 4.

The casings and the filling strips may be vulcanized together at a temperature which does not injuriously affect the cork. The casing shown in Fig. 2 may be formed into a tube by vulcanizing together the edges of a strip after the cork has been inserted. I have found that for a thirty by three inch tire, four spring-steel rods 2, each five-sixteenths inch in diameter, are sufficient, but a larger or smaller number may be used in other sizes. By positioning these rods near the outer surface of the ring of cork the disks comprising the ring are held more firmly together at their edges, thus providing for a very stiff ring. The springs 4 are preferably three-quarter inch in diameter and spaced about two inches centers. The tread of the casing is preferably about five eighths inch thick, but thicker treads give longer service.

The details and proportions of the parts may all be changed by those skilled in the art without departing from the spirit of my invention as set forth in the following claims.

I claim:—

1. A resilient vehicle tire comprising a solid ring of cork and a casing constituting a wearing surface, said ring of cork being formed with a series of radial holes in its outer surface of less depth than the thickness of the ring, and springs mounted in said holes.

2. A resilient vehicle tire comprising sectors of cork constituting a ring and spring-steel rings extending through the sectors coaxially of the tire, a casing for the cork, said ring of cork having a series of radial holes whose depth is approximately one-half the thickness of the ring, and coil springs mounted in said holes and exerting outward pressure on the casing.

MARTIN H. CONDRY.